3,417,088
METHOD FOR PRODUCING 9,10-DIAZA-
PHENANTHRENE
James E. Kmiecik, Lake Charles, La., assignor, by mesne assignments, to Columbian Carbon Company, a corporation of Delaware
No Drawing. Filed Dec. 3, 1963, Ser. No. 327,830
1 Claim. (Cl. 260—250)

ABSTRACT OF THE DISCLOSURE

High pressure ring closure of dinitrobiphenyls in the presence of carbon monoxide and metal carbonyl catalysts is described.

---

This invention relates to the preparation of aromatic diaza compounds. More particularly, this invention relates the preparation of 9,10-diaza phenanthrenes by the reductive, intramolecular cyclization of certain dinitro aromatics.

Prior art methods for producing diaza compounds are based on reductive cyclizations of dinitro compounds with iron, ferrous oxalate, hydrogen, zinc and hydrazine-palladized charcoal mixtures.

It has now been found that 9,10-diazophenanthrenes can be prepared by the reductive intramolecular cyclization of certain dinitro compounds by reaction with carbon monoxide in the presence of a metal carbonyl.

The general reaction involved in the method of this invention can be illustrated by the following generic equation:

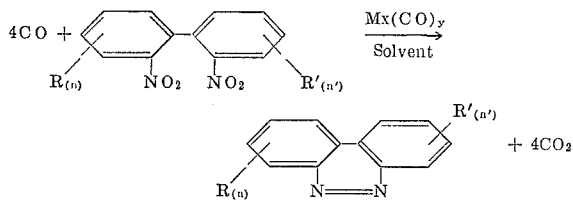

wherein each of R and R' represents hydrogen or a group attached to a ring carbon atom of the diphenyl compound which is substantially inert to the reactants and reaction conditions employed; each of $(n)$ and $(n')$ is an integer from one to three; M is a carbonyl forming metal and $x$ and $y$ are whole numbers.

Each of the substituents R and R' of the above generic equation can be hydrogen or a group which is substantially stable to the reactants and reaction conditions. Thus, such a group can be a hydrocarbon having from one to about twelve carbon atoms, an alkoxy group having from one to about twelve carbon atoms, a halogen, an amino group, or a ketone. Preferably, each R and R' is hydrogen, a hydrocarbon and particularly alkyl, halogen or primary amino.

Illusrative of hydrocarbon substituents which may be employed there can be mentioned: alkyls such as octyl, decyl, heptyl and particularly lower alkyls such as methyl, ethyl, propyl, butyl and isopropyl; aryls such as phenyl and naphthyl; phenalkyls and particularly lower phenalkyls such as benzyl, phenylethyl, phenylpropyl and the like; alkphenyls and particularly lower alkyphenyls such as 2-methylphenyl, 4-ethylphenyl, 4-butylphenyl, 2,5-dimethylphenyl and the like. Illustrative of alkoxy groups there can be mentioned lower alkoxy groups such as methoxy, ethoxy, propoxy, butoxy and the like. Halogen substituents can be those of fluorine, chlorine, bromine and iodine. It should be noted that R, R', $(n)$ and $(n')$ can be at the same or different and $(n)$ or $(n')$ can be 1, 2 or 3. The amino substituents can be primary amino, secondary amino or tertiary amino. Illustrative of secondary and tertiary amino groups there can be mentioned those of lower alkylamines such as N-methyl, N,N-dimethyl, N-propyl and N,N-dipropyl. Illustrative of keto groups can be mentioned alkylcarbonyls of 1 to 12 carbon atoms, such as methylcarbonyl, ethylcarbonyl and the like.

The term "lower" as employed herein to modify an alkyl limits, the number of carbon atoms in the alkyl to no more than about 6.

The reaction of this invention is conducted in an inert organic solvent in which the dinitro reactant is dissolved. Suitable solvents include various classes of compounds including hydrocarbons, halogenated hydrocarbons, alcohols, ethers, amines and other inert solvents. By the expression "inert" it is meant that the solvent is inert to the reactants and products under the conditions used, and is miscible with the dinitro reactant. Suitable solvents include benzene, toluene, p-xylene, o-xylene, m-xylene, hexane, cyclohexane, ethylcyclohexane, petroleum ether, chlorobenzene, carbon tetrachloride, chloroform, acetone, diethylenediamine, ethanol, propanol, butanol, ethylene glycol, glycerol, furyl alcohol, dioxane, and other organic solvents. Mixtures of solvents can also be employed.

A suitable generic formula for the metal carbonyl catalyst is $M_x(CO)_y$ wherein M is a metal and $x$ and $y$ are whole numbers. The metal can be a transition metal and particularly a carbonyl forming metal from Group 8 of the Periodic System of elements. The letters $x$ and $y$ of the generic formula for the catalyst represent the coordination number for the metal carbonyl. Preferably, the catalyst is soluble in the inert organic solvent employed in the reaction. However, the catalyst can be maintained in suspension if it is substantially insoluble. A suitable particle size for catalyst which is insoluble in the solvent is between 100 to 300 mesh, U.S. Sieve Series, although particles as large as 20 mesh are useful. Illustrative of the metals of the metal carbonyl catalyst there can be mentioned those of iron, molybdenum, ruthenium, manganese, osmium, rhodium, cobalt, nickel, iridium, tungsten, titanium, and the like.

Illustrative of specific metal carbonyl catalyst of this invention there can be mentioned those of the formula: $Cr(CO)_6$; $Mo(CO)_6$; $W(CO)_6$; $Mn_2(CO)_{10}$; $Re_2(CO)_{10}$; $Fe(CO)_5$; $Fe_2(CO)_9$; $Fe_3(CO)_{12}$; $Ru(CO)_5$; $Ru_2(CO)_9$; $Ru_3(CO)_{12}$; $Os(CO)_5$; $Os_2(CO)_9$; $Co_2(CO)_8$; $Co_4(CO)_{12}$; $Rh_2(CO)_8$; $Rh_4(CO)_{12}$; $Ir_2(CO)_8$; $Ir_4(CO)_{12}$; and $Ni(CO)_4$. The preferred catalyst is iron pentacarbonyl.

Illustrative of the dinitro reactants which can be employed in the process of this invention there can be mentioned:

2,2'-dinitrobiphenyl;
2,2'-dinitro-4,4'-dimethylbiphenyl;
2,2'-dinitro-3,3'-dichlorobiphenyl;
2,2'-dinitro-3-methoxylbiphenyl;
2,2'-dinitro-3,4'-diaminobiphenyl;
2,2'-dinitro-4,4'-diethylbiphenyl;
2,2'-dinitro-3,5-dibenzylbiphenyl;
2,2'-dinitro-3,4,5-trimethylbiphenyl;
2,2'-dinitro-4,4'-diethyoxybiphenyl and the like. Illustrative of the diaza compounds prepared by the process of this invention there can be mentioned:

9,10-diazaphenanthrene(benzo[c]cinnoline);
2,7-dimethyl-9,10-diazaphenanthrene;
4,6-diethoxy-9,10-diazaphenanthrene;
3,4-dichloro-9,10-diazaphenenthrene;
2-amino-9,10-diazaphenanthrene;
2,7-dibromo-9,10-diazaphenanthrene;
3,6-diethyl-9,10-diazaphenanthrene;

2,7-dimethyl-3-chloro-9,10-diazaphenanthrene;
2,7-diamino-9,10-diazaphenanthrene;
4,5-difluoro-9,10-diazaphenanthrene, and the like.

The reaction conditions for the process of this invention can vary over a wide range. Thus, reaction temperatures can vary from about 100° C. to 300° C. and preferably from about 150° C. to about 250° C. The carbon monoxide pressure can vary from about 1,000 p.s.i.g. to about 10,000 p.s.i.g. and preferably for about 2,000 p.s.i.g. to 5,000 p.s.i.g.

As shown by the generic equation hereinbefore, four moles of carbon monoxide react with one mole of the dinitro reactant to produce the diaza compound. The quantity of carbon monoxide contacted with the dinitro reactant can be the stoichiometric quantity shown by the generic equation or can be in lesser or greater amounts such as from about 0.1 to 20 moles of CO per mole of dinitro reactant, although preferably an excess of carbon monoxide is employed such as that of 4.5 to 10 moles of carbon monoxide per mole of dinitro reactant. Contact of the dinitro reactant and carbon monoxide can be assisted by various means such as by contacting a solution of the dinitro compound in an inert organic solvent with CO at the desired pressure and temperature and subsequently rocking or in some other fashion agitating the solution. Additionally, other means for aiding contact of the reactants can be employed such as by passing the CO through a solution of the dinitro reactant in an organic solvent. Carbon monoxide gas applied to the reaction mixture can be substantially pure or can contain minor quantities, e.g., less than about 10 percent by weight, of inert diluents such as nitrogen, carbon dioxide, etc. Preferably the carbon monoxide employed is substantially pure.

The reaction time can vary from less than one hour to over ten hours, and preferably from about one to about three hours. The catalytically effective quantity of metal carbonyl can vary from about 0.02 to about 1 mole of catalyst per mole of dinitro reactant and preferably from about 0.05 to 0.2 mole of catalyst per mole of dinitro reactant. The inert organic solvent should be sufficient to dissolve an appreciable portion of the dinitro reactant. Illustratively the quantity of solvent can vary from about 1 to 50 moles of solvent per mole of dinitro reactant and preferably from about 10 to 25 moles of solvent per mole of dinitro reactant.

The compounds prepared by the methods of this invention are useful as stabilizers for chlorinated hydrocarbons and as intermediates for the preparation of fungicides.

EXAMPLE 1

Preparation of 9,10-diazaphenanthrene

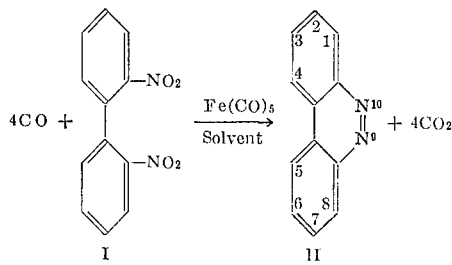

I          II

The experimental procedure for this conversion was as follows: A 1400-ml., glass-lined, rocking autoclave was charged with a solution of 12.2 g. (0.05 mole) of 2,2′-dinitrobiphenyl and 1.0 g. (0.005 mole) of iron pentacarbonyl in 150 ml. of dry benzene. The reactor was flushed with CO and pressured to 2000 p.s.i.g. with CO. The temperature was raised to 204° and the mixture rocked for three hours at 204–16° under a pressure of 3325–3430 p.s.i.g.

After cooling, excess gases were vented and the reaction mixture filtered to remove a black solid. This solid was washed with hot benzene and the washings and original filtrate combined. Evaporation of the combined solutions produced 2.8 gms. of yellow solid, M.P. 135–40°. After recrystallization from 50% aqueous methanol, the material melted at 145.5–50.5. Recrystallization from cyclohexane gave yellow crystals of 9,10-diazaphenanthrene (benzo[c]cinnoline), M.P. 149–54° (reported M.P. 154°). Further recrystallizations did not narrow the melting point range. The infrared and ultraviolet spectra of the recrystallized material were consistent with those expected for benzo[c]cinnoline. The presence of small amounts of nitro and amino compounds in the product was indicated and this, no doubt, accounts for the observed melting point discrepancy.

EXAMPLE 2

Following the procedure of Example 1 equivalent molar quantities of the following dinitro reactants can be substituted in place of the 2′,2′-dinitrobiphenyl to prepare the corresponding diaza compounds; 2,2′-dinitro-4,4′-dibromobiphenyl to prepare 2,7-dibromo-9,10-diazaphenanthrene; 2,2′-dinitro-4,4′-dimethylbiphenyl to prepare 2,7-dimethyl-9,10-diazaphenanthrene; and 2,2′ - dinitro - 3-amino-4′-methoxy to prepare 1-amino-7-methoxy-9,10-diazaphenanthrene. Also in place of iron pentacarbonyl catalyst there can be employed nickel carbonyl or any of the other metal carbonyl mentioned hereinbefore.

The Periodic System referred to herein is that which is found on page 695 of Hackh's Chemical Dictionary, second edition. Preferably, the diaza compounds prepared by the method of this invention contain no more than about 24 carbon atoms.

What is claimed is:

1. A method for preparing 9,10-diazaphenanthrene which comprises contacting 2,2′-dinitrobiphenyl dissolved in a hydrocarbon solvent at a temperature of from about 150° C. to about 250° C.; with iron pentacarbonyl and with carbon monoxide under pressure of from about 2,000 p.s.i.g. to about 5,000 p.s.i.g.

References Cited

UNITED STATES PATENTS 3,249,611    5/1966    Hirsch _____ 260—250

NICHOLAS S. RIZZO, *Primary Examiner.*

D. DAUS, *Assistant Examiner.*

U.S. Cl. X.R.

23—203; 260—645, 578, 590; 252—443, 401; 260—576